United States Patent [19]

Gurkin

[11] Patent Number: 4,733,424
[45] Date of Patent: Mar. 29, 1988

[54] RETRACTABLE AND SLIDABLE DOORMAT HOUSING

[76] Inventor: David E. Gurkin, 3035 Guildford "B", Boca Raton, Fla. 33434

[21] Appl. No.: 34,683

[22] Filed: Apr. 6, 1987

[51] Int. Cl.$^4$ ............................................. A47L 23/22
[52] U.S. Cl. ...................................... 15/161; 15/238; 15/215; 15/268; 248/110
[58] Field of Search ................. 15/161, 215, 216, 217, 15/237, 238, 239, 240, 241, 268; 211/66; 248/110, 111

[56] References Cited

U.S. PATENT DOCUMENTS

| 26,895 | 11/1910 | Nicholson | 15/216 |
| 1,022,950 | 4/1912 | Jones | 15/161 |
| 2,217,570 | 10/1940 | Stroup | 15/215 |
| 2,857,173 | 10/1958 | Benander | 15/237 |

*Primary Examiner*—Harvey C. Hornsby
*Assistant Examiner*—J. Poffenberger
*Attorney, Agent, or Firm*—Ernest H. Schmidt

[57] ABSTRACT

A doormat housing comprising a swingingly retractable doormat tray seated within which is a doormat, is slidably affixed against one side of an entranceway door for use when the door is opened. In use, the doormat housing is slidingly moved to a lowered position whereat, upon the downward and outward swinging of the doormat tray, the tray with mat will seat against the floor or walking surface close to the entranceway.

5 Claims, 5 Drawing Figures

RETRACTABLE AND SLIDABLE DOORMAT HOUSING

The use of doormats for wiping shoes before entering a residential building is, of course, well known. Weather resistant doormats for this purpose are generally placed just outside the entrance door. The use of doormats in this manner at the entrance of individual homes presents no obstruction problems, even if the doormat is fairly thick, because the surrounding space is usually sufficient to allow full observation of the doormat as an obstacle when approaching the entrance door.

With the widespread advent of condominium living, however, the use of doormats presents obstruction problems. Since condominiums or multiple apartment buildings often have narrow hallways and narrow external catwalks, they leave little space for walking around doormats when passing other apartment entrances before reaching one's destination apartment. Since the use of outer doormats in such instances, especially thick doormats, can be a serious stumbling hazard, especially at night, condominium associations and building management authorities have strict rules in their regulations forbidding the placing of doormats and other objects which might obstruct free passage along catwalks, decks and the like.

It is, accordingly, the principal object of this invention to provide a retractable doormat housing for condominium apartments and the like that folds or swings up against one side of an entrance door when not in use, thereby not obstructing outside passageways when the door is closed.

Another object of the invention is to provide a retractable doormat housing of the character described which can be applied to either outwardly or inwardly-opening entrance doors.

Yet another object of the invention is to provide a retractable doormat housing which, when installed against the inner face of an outwardly-opening door stepping to a lower catwalk or the like, includes sliding track means for lowering the doormat housing to seat against the catwalk for use of the contained doormat.

Another object of the invention is to provide a retractable and slidable doormat housing of the character described including manually operable latch means for retaining the housing and its contained doormat in retracted or withdrawn position when not in use.

Yet another object of the invention is to provide a retractable and slidable doormat housing which will be simple in construction, economical to manufacture, durable in use and inconspicuous in appearance.

Other objects, features and advantages of the invention will be apparent from the following description when read with reference to the accompanying drawings.

In the drawings, wherein like reference numerals denote corresponding parts throughout the several views.

Figure 1:
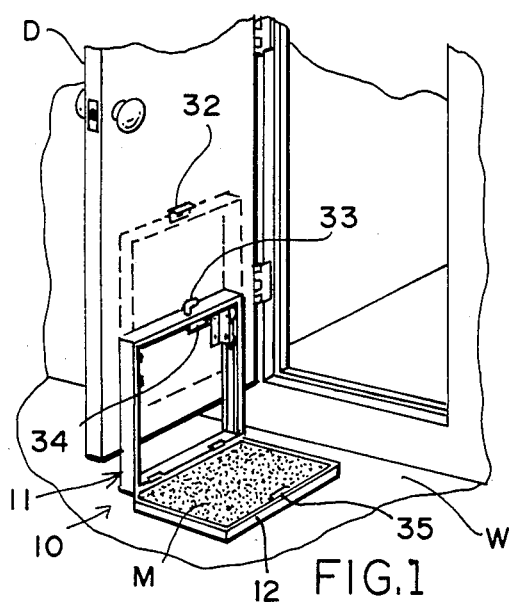
FIG. 1 is an oblique view illustrating an outwardly-opening residential entrance door in open position and with the retractable doormat housing in lowered position, seated against the walkway for use of the contained doormat for wiping one's shoes.

Reference numeral 10 in FIG. 1 illustrates a preferred embodiment of the invention shown in use when installed against the inside of an outwardly-opening entrance door D having a dropped exterior entrance walkway W.

Figure 5:
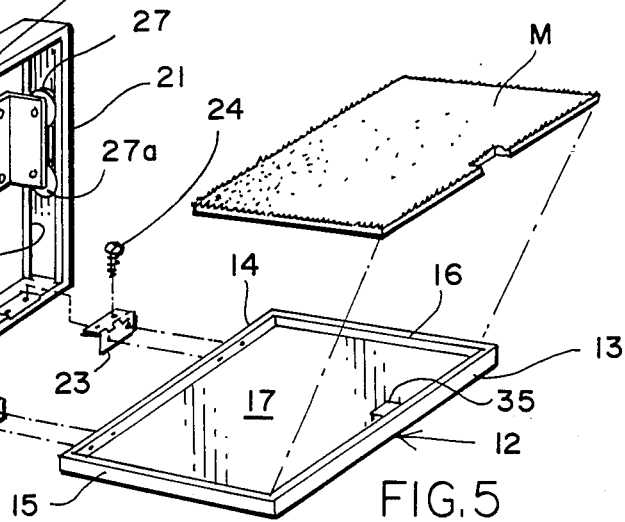
FIG. 5 is an "exploded" view of the retractable and slidable doormat housing illustrated in FIGS. 1 through 4, shown separately.

Referring to FIG. 5, the doormat housing comprises, generally, a rectangular housing frame 11, a shallow rectangular doormat tray 12, hinged and having upper and lower horizontal sidewall portions 13, 14 and left and right vertical sidewall portions 15, 16, respectively. Bottom panel 17 of the doormat tray has removeably seated thereupon a suitable doormat M. The height of the peripheral doormat tray sidewall portions 13, 14, 15, 16 is such that the upper or wiping surface of the doormat used will lie on substantially the same plane as the outer edges of the sidewall portions 13–16.

Figure 2:
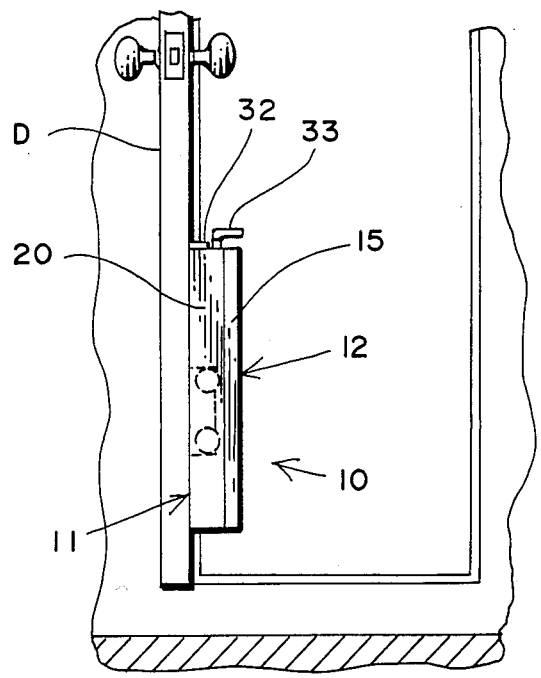
FIG. 2 is a partial front elevational view of the entranceway and door illustrated in FIG. 1, the door being shown in perpendicular, outwardly-extending position and with the retractable doormat housing being shown upwardly withdrawn in retracted position against the inner surface of the door.
Figure 3:
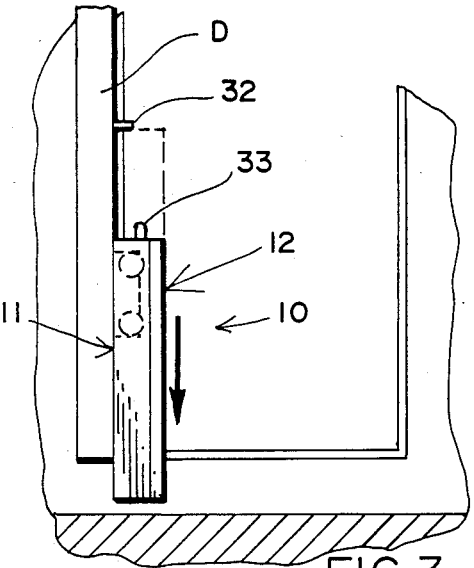
FIG. 3 is a partial front elevational view as illustrated in FIG. 2 but showing the doormat housing moved to its lowered position for seating the housing doormat tray against a lowered walkway surface at the door entrance.
Figure 4:
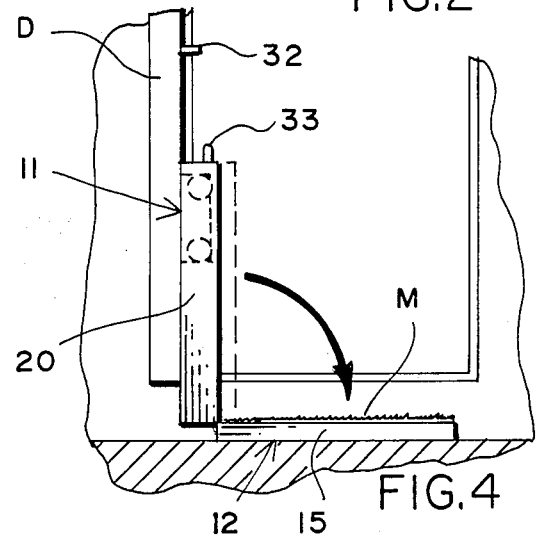
FIG. 4 is a partial front elevational view as illustrated in FIG. 3 showing the doormat or rug tray released and swung outwardly in seated position against the walkway, ready for use, as in FIG. 1.

Doormat housing frame 11 is rectangular in shape and of the same size in external dimensions as the doormat tray 12. It comprises upper and lower horizontal housing frame members 18,19 and left and right side vertical sidewall members 20,21. The lower horizontal sidewall portion 14 of the doormat tray 12 is hinged to the lower horizontal frame member 19 of the housing frame 11 as by a pair of spaced hinges 22, 23, secured in place as by screws 24. The inter-connecting hinges 22, 23 provide for swinging the doormat tray 12 with its contained doormat M in retracted position against the doormat housing frame 11, as illustrated in FIG. 2, for example.

Means is provided for attaching the doormat housing assembly against the inside (for example) of an entrance door in such a manner that it can be moved up and down while thereagainst to permit the doormat tray to seat against a walkway surface for use of the doormat. To this end, the inner surfaces of the housing frame vertical sidewall members 20, 21 have fixed thereagainst formed metal tracks 25–26 having inwardly-curved, vertically-extending, opposed side portions defining a track within which peripherally grooved roller pairs 27, 27a and 28, 28a are captured for vertical sliding movement. The roller pairs 27, 27a and 28, 28a are journalled to one side of right angular members 29, 30, respectively. The free sides of the right-angular members 29, 30 are provided with vertically-spaced screw hole openings 31, by means of which the doormat housing assembly can be attached against an entrance door, as by screws 30a.

Means is provided for retaining the doormat housing assembly in its uppermost position against the inner surface, for example, of the door when not in use. Thus, as illustrated in FIGS. 2 and 5, the upper frame member 18 of the doormat and housing frame 11 is provided, centrally along its length, with a bolt latch 33 cooperative with a striker 32 fixed against the inside of the door and having a bolt opening for the reception of the latch bolt upon the manual turning of the latch handle. The striker 32 has an outwardly-extending abutment portion at its upper end which limits upward movement of the doormat housing frame 11.

Means is also provided for releasably retaining rectangular doormat tray 12 in its upwardly swung position when not in use. To this end, the upper horizontal housing member 18 also has fixed thereto a centrally positioned magnetic latch 34 cooperative with a steel clip 35 fixed centrally along the inside of the upper horizontal sidewall portion 13 of the doormat tray 12 to retain said doormat tray in its upwardly swung position of non-use by magnetic attraction. Release for use as a doormat is accomplished simply by pulling outwardly at the upper end of housing frame 11, which can readily be accomplished with little effort.

While the invention is illustrated and described herein as used in an outwardly-opening entrance door, it is to be understood that the invention is well adaptable as well to use with inwardly-opening entrance doors. In such usage, the housing assembly 10 will be attached against the outside of the door, so that when the door is swung inwardly for entering, it will be positioned for lowering and dropping of the doormat tray 12 against the floor of the hallway just inside the door threshhold, and will thus be easily available for use upon entering and before stepping upon interior flooring.

While I have illustrated and described herein only one basic form in which my invention can conveniently be embodied in practice, it is to be understood that this embodiment is presented by way of example only and not in a limiting sense. The invention, in brief, comprises all the embodiments and modifications coming within the scope and spirit of the following claims.

What I claim as new and desire to secure by Letters Patent is:

1. A retractable doormat housing comprising, in combination, a rectangular housing frame member, means for mounting one side of said housing frame member against one side of an entranceway door, a rectangular doormat tray of substantially the same size as said housing frame member, a hinge for swingably attaching said doormat tray along the lower edge portion thereof with respect to a lower edge portion of said housing frame member, a doormat seated in said doormat tray, said doormat tray being moveable between a closed position against the outside of said housing frame member and an open position extending substantially perpendicularly outwardly of said housing frame member, manually releasable means for retaining said doormat tray in said closed position and, means for slidingly mounting said housing frame member on said entrance door for vertical movement between upper and lower positions, selectively, of the entranceway door whereby said housing frame member is moved to its lower position to place said doormat tray adjacent a doorway entrance, and moved to its upper position for storage, and means for normally retaining said frame member in said upper position.

2. The invention as defined in claim 1 wherein said means for slidingly moving said housing frame member comprises a vertically-extending track fixed within said housing frame member and roller wheels journalled at a fixed position with respect to said one side of said entranceway door and cooperatively received within said vertically-extending track.

3. The invention as defined in claim 2 wherein said means for normally retaining said frame member in said upper position comprises a bolt latch member mounted at the upper end of said housing frame member and a striker fixed with respect to said one side of said door, said bolt latch having a bolt portion retractably receivable within an opening in said striker.

4. The invention as defined in claim 3 wherein said striker further comprises an outwardly-extending abutment portion limiting said housing frame member at said upper position.

5. The invention as defined in claim 4 wherein said releaseable doormat tray retaining means comprises a magnetic latch cooperative with a steel clip.

* * * * *